United States Patent Office 3,102,062
Patented Aug. 27, 1963

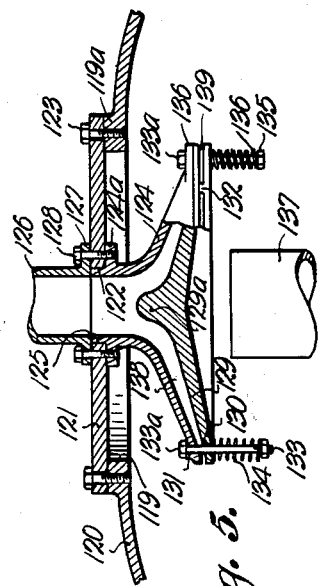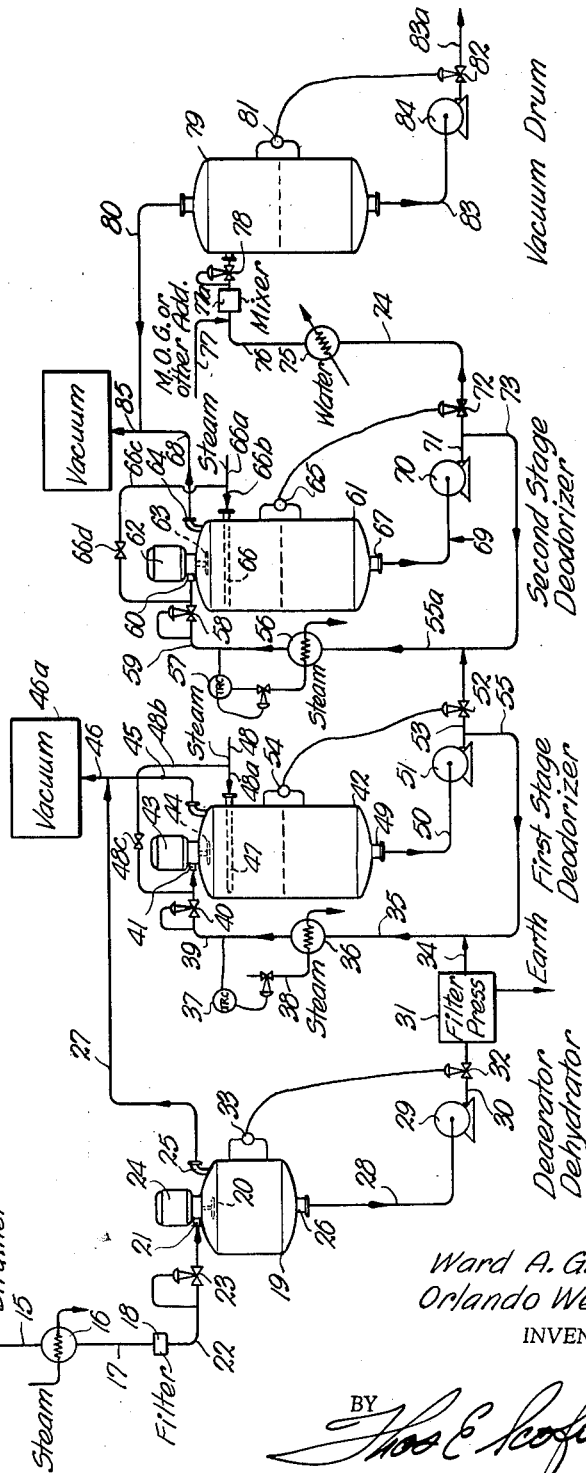

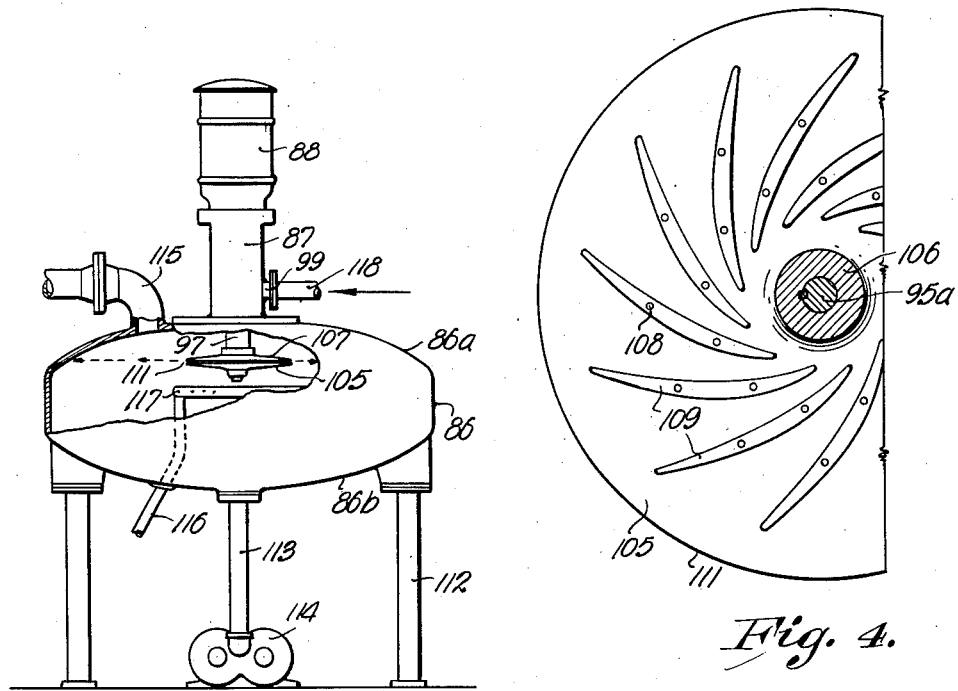
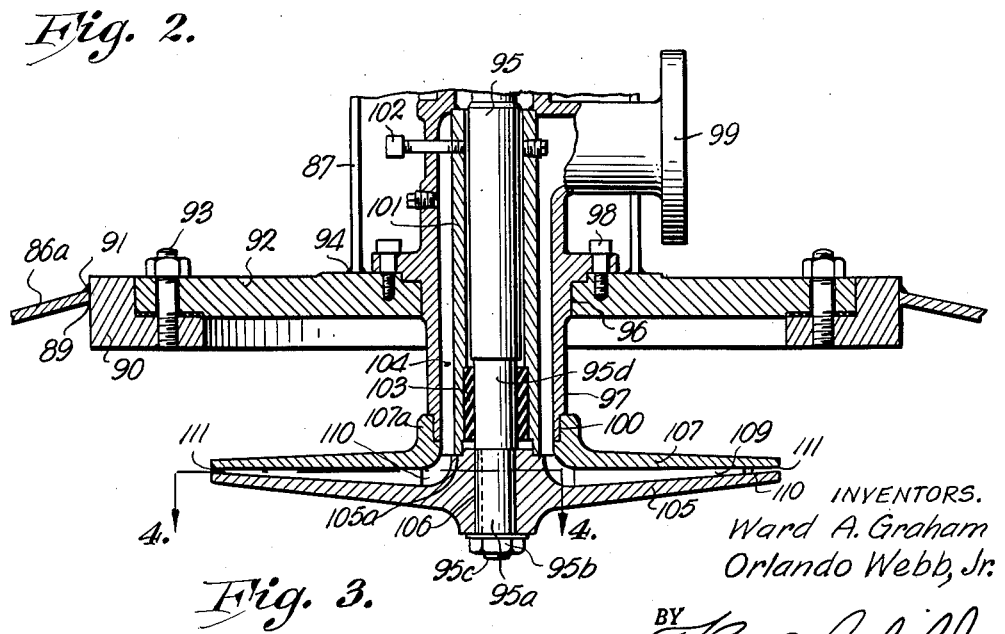

3,102,062
APPARATUS FOR CONTINUOUS EDIBLE
OIL FINISHING
Ward A. Graham, Kansas City, Mo., and Orlando Webb, Jr., Prairie Village, Kans., assignors to Stratford Engineering Corporation, Kansas City, Mo., a corporation of Delaware
Filed Mar. 28, 1960, Ser. No. 17,846
2 Claims. (Cl. 159—3)

This invention relates to apparatus for finishing edible oils and refers more particularly to such methods and apparatus for deaeration, dehydration, deodorization, distillation (including fatty acid removal) and color improvement of refined edible oils such as soybean oil, cottonseed oil, peanut oil, linseed oil, castor oil, fish oils, animal oils, etc.

At the present time, refined edible oils are finished by batch, improved batch, semi-continuous, or continuous treatment employing conventional vacuum drying and steam stripping techniques. In these known conventional systems, finished oils meeting odor, taste and color stability requirements of the food, food processing, drug and other oil consuming industries are achieved through the use of high temperature, low absolute pressures and relatively large quantities of stripping steam. One prominent limiting feature of these conventional systems is the relatively low oil-steam interfacial surface area exposed to treating conditions and the required treating time accordingly necessary. Another limiting feature is the inability to achieve a high degree of uniformity in the treated oil due to limitations of surface area control. As a result of these limitations, deaeration, dehydration, distillation and deodorization of the oils are relatively inefficiently performed. Deodorization in the industry is accomplished in complicated, expensive equipment requiring excessive time with relatively unreliable product achievement of standards. Deaerating and deodorizing equipment in the industry are space consuming, complicated to operate and maintain, require excessive instrumentation, are often not fully automatic and often require excessive operator attention. Conventional deaerating and deodorizing equipment is also difficult to clean and repair.

Therefore, an object of the instant invention is to provide a continuous edible oil finishing process with improved deaerating, dehydrating, distilling and deodorizing steps or stages, including fatty acid removal and improved apparatus for performing such steps.

Another object of the invention is to provide deaerating, deodorizing, distilling and dehydrating apparatus for finishing edible oils which is simple to operate and maintain, takes up a minimum of space, requires a minimum of instrumentation, is fully automatic, and which requires a minimum of operator attention.

Another object of the invention is to provide apparatus for deaerating, dehydrating, distilling and deodorizing edible oils wherein the equipment is readily accessible in all parts thereof for cleaning or repair.

Another object of the invention is to provide methods of and apparatus for deaerating, dehydrating, distilling and deodorizing edible oils wherein less steam is required to do an equivalent finishing job to that presently performed, while the same quantity of steam permits a better job to be done.

Another object of the invention is to provide methods of and apparatus for deaeration, dehydration, distilling and deodorization of edible oils in the finishing process wherein the deaeration, dehydration, distillation and deodorization are far more thorough, accomplished in less time in less complicated equipment and wherein far more reliable product achievement of standards is realized.

Still another object of the invention is to provide methods of and apparatus for finishing edible oils wherein there is substantially less chance of off-specification product and wherein a great uniformity of exposure of the edible oil is achieved in the finishing process.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

FIG. 1 is a schematic flow diagram of an apparatus embodying the inventive process.

FIG. 2 is a side, partly cut away view of a flash evaporator employable at 19, 42 or 61 in FIG. 1.

FIG. 3 is a side sectional view of the rotatable spray head of FIG. 2, the view enlarged and partial.

FIG. 4 is a view taken along the line 4—4 of FIG. 3 in the direction of the arrows.

FIG. 5 is a view similar to that of FIG. 3, but showing a static, nonrotating spray head adaptable for use in the flash evaporator shown at 19, 42 and 61 of FIG. 1.

Vegetable oils are conventionally obtained by either expression or solvent extraction. Description of typical expression and solvent extraction processes may be found in "The Chemical Process Industries," R. Norris Shreve, 2nd ed., 1956, McGraw-Hill Book Company, Inc. Crude oils obtained by either of these processes are conventionally purified. A recently developed liquid-liquid extraction process for refining of vegetable and animal fats and oils is superseding to a certain extent the once widely used alkali purification. In the alkali method, the free fatty acids are neutralized with caustic soda or soda-ash, forming soaps which are removed by centrifuges or filters and the fatty acids recovered. Oils are subsequently water washed for final removal of soap and unreacted caustic.

Referring to the drawing, at 10 is schematically indicated conventional processes of caustic refining, including water wash. This step does not form a part of the instant invention as it is conventional. The oil to be finished is passed through line 11 to a vessel 12 where diatomaceous earth, activated carbon, clay, filter aid or other decolorizing agent is added, typically through a star feeder 12a, mixed by rotor 12b. The oil is then passed through line 13 to a primary earth strainer 14 or filtering device where overly-large particles of the diatofaceous earth, filter aid or activated carbon are removed. From strainer 14, the oil is passed through line 15 to heat exchanger 16 where the temperature of the oil is raised to that necessary for subsequent treatment. For example, in the case of soybean oil, this temperature would be approximately 145° F. The oil is then passed by line 17 through filter 18 which removes particles larger than 0.001 to 0.015 inch diameter, depending on the rotor orifice to be described. Generally it is preferred to stay 0.001 to 0.005 inch under the rotor orifice.

Flash evaporator vessel 19 has a spray distribution head or rotor 20 mounted in the upper portion thereof to which edible oil is fed through input fitting 21. Flow line 22 having back pressure valve 23 thereon passes the edible oil to be dehydrated and deaerated to fitting 21. Prime mover 24 operates to rotate the spray device (if it is a rotor) at a predetermined velocity. The spray device employs an aligned lip orifice of less than 0.020 inch in a manner to be described. Vacuum fitting 25 is attached to the upper portion of vessel 19 and drain fitting 26 is provided at the bottom of vessel 19. Vacuum is pulled through line 27 to create a zone of reduced pressure in vessel 19. The input oil to rotor 20 is distributed in highly dispersed fashion in a thin film of atomized particles which coalesces on the vessel walls and passes down to the sump from where it is taken from fitting 26 by line 28.

Motivated by pump 29, the oil is passed through line 30 to filter press 31 controlled, as well, by valve 32 connected to liquid level control 33 on vessel 19. In filter press 31, the remaining diatomaseous earth, clay, activated charcoal or other decolorizing substance is removed from the oil and it is then passed through line 34 to the deodorizing step.

Line 34 joins recycle line 35 which passes to heat exchanger 36. The latter raises the oil to a temperature necessary for deodorization. Temperature range control 37 connects to the heat exchanger steam input line 38 and output line 39 from the heat exchanger. Back pressure valve 40 is positioned on line 39 between the heat exchanger and the input fitting 41 of the first deodorizer flash evaporator 42. Back pressure valve 40, as is the case in back pressure valves 23 already described and 58 to be described, are entirely conventional in nature and operate to hold a back pressure in the line behind same. The valves move toward wide open position in each case with increasing pressure. Thus it is proportionately controlled by the pressure in the line feeding it at a point immediately upstream of the valve. Each valve typically contains, in the cap thereof, a diaphrgam connected to a spring loaded valve stem, with pressure transmitted through the overhead line on the side of the diaphragm away from the valve.

Evaporator 42 is of substantially the same construction as evaporator 19 with the exception that the body portion thereof is of greater volume whereby to permit the time control procedure to be described. Prime mover 43 rotates rotor 44 or a static spray head having an aligned lip orifice in the critical range of 0.002 to 0.020 inch. Vacuum line 45 joins vacuum line 27 in common line 46 passing to conventional source of vacuum 46a. A hollow perforated ring 47 may be provided, fed by main steam input line 48. Main steam line feeds secondary lines 48a (to ring 47) and 48b, the latter controlled by valve 48c and joining line 39 after valve 40. Output fitting 49 feeds output line 50 having pump 51 thereon. Control valve 52 on line 53 is connected to liquid level control 54 on the side of vessel 42. Recycle line 55 connects to line 35 which passes to heat exchanger 36.

The function of the first deodorizer section will now be described. The edible oil passing through the heat exchanger 36 is raised to the temperature necessary for deodorization and for fatty acid-production and distillation. Steam may be added through line 48b before dispersal to aid volatile extraction. The oil (and optional steam) is dispersed through the critical form and size orifice of the rotor or spray head 44 in a finely divided mist under vacuum conditions. The steam input through ring 47 strips the droplets thereabove of undesirable volatile constituents which are drawn off through line 45 with the steam. Bottoms are drawn off through line 50 and pump 51, discharge flow from the first deodorizer section being controlled by valve 52 hooked to liquid level control 54. Valve 52 controls the quantity of recycle for successive passes through the rotor 44 whereby to build up a resident body of edible oil in the vessel 42. The throughput of the first deodorizer section is balanced with the resident volume to provide a carefully regulated residence time in the vessel 42. A typical recycle-throughput ratio would be 9 to 1, whereby only one-tenth of the oil through line 53 would have had only one pass through the rotor. A very large evaporator might permit up to say, 49 to 1 recycle, but, nevertheless, one-fiftieth of the product would have had only a single pass through the evaporator rotor. As a very small amount of nondeodorized oil will contaminate a very large quantity of deodorized oil, we have concluded that a minimum of two passes through a rotor for all of the oil and a minimum quantity of the oil having had but two passes is required for effective deodorization.

From the first deodorizer section line 53 passes to line 55a of the second deodorizer section, the latter running to heat exchanger 56. Temperature range control 57 and back pressure valve 58 are provided on line 59 connecting to the input fitting 60 of second deodorizer section evaporator 61. Evaporator 61 is the same in structure and operation as evaporator 42 with prime mover 62 driving rotor 63, vacuum fitting 64, liquid level control 65, steam input ring 66 and output fitting 67 at the bottom of the vessel. Main steam input line 66a feeds ring 66 through line 66b and optionally passes steam to line 59 after valve 58 through line 66c controlled by valve 66d. Vacuum line 68 is connected to fitting 64, while output line 69 has pump 70 thereon, from which discharge line 71 runs. Control valve 72 is connected to level control 65, while recycle line 73 connects to lines 53 and 55a.

The function of the second deodorizer section is identical to that of the first and cumulative therewith. The input edible oil from discharge line 53 is maintained at the desired temperature by heat exchanger 56 and distributed with or without added steam in a fine particle spray into vacuum zone in vessel 61 through an aligned lip orifice of less than 0.020 inch width. Stripping steam removes undesirable volatiles through line 68. Bottoms from flash evaporator pass through line 69 to recycle or the next stage. A body of edible oil is maintained in the vessel 61 by suitable control through valve 72 whereby to give a carefully regulated treating time.

Only two deodorizer sections are shown. This is conceived as adequate. However, additional sections would yet further improve the quality and product control. It should be noted in two identical deodorizer sections, with a 9 to 1 recycle in each, one one-hundredth of the product will have only two passes. With the addition of another section, one one-thousandth of the product would have at least three passes and the remainder a greater number. Economics limit the number of deodorizer sections possible. Final stage could, or possibly should, be only single pass.

Line 74 passes the deodorized oil to cooler 75 and from thence by line 76 through an additive stage represented by line 77, mixer 77a and back pressure valve 78 to vessel 79, where a body of finished edible oil is stored under vacuum, the latter taken off through line 80. Liquid level control 81, connected to valve 82 on discharge line 83a having pump 84 thereon, regulates the volume of oil in the vessel. Line 80 may be connected to a common line 85 to which line 68 is connected. Or, all vacuum lines in the entire system may be connected to a single vacuum system. From vessel 79, the edible oil is passed to final storage, packaging, etc.

The key to the instant system is in the deodorizer section where at least one recycle flash evaporation unit is employed. A minimum number of two recycle flash evaporator units with steam stripping of at least one is presently projected. The pressure of the flash evaporator 19 provides an optimum system which will deaerate and dehydrate more efficiently than any present existent system. However, the deodorizer system alone without evaporator 19 will process conventionally prepared and conventionally deaerated oil to a finish level above present practice. In the deodorizer section, there are two critical variables. In the first place, sufficient residence time must take place at the critical temperature at which fatty acids form to achieve equilibrium between their rate of formation and rate of removal through lines 45 and 68. Secondly, there must be sufficient passes through the rotor for all or at least substantially all of the oil to be efficiently and effectively deodorized by the steam. As above mentioned, two recycle evaporators of the character described are projected as required.

FIGS. 2–4, inclusive, show a rotating spray device employed in a low pressure vessel as 19, 42 and 61, which will be first described. FIG. 5 shows a nonrotating spray head adaptable for use in like low pressure vessels.

The operation of the apparatus of FIGS. 2-4, inclusive, consists in the impartation of high rotative velocity or energy to a fluid mixture by means of an atomizing rotor, the rotor consisting of a liquid accelerating disc and a shrouding disc spaced apart to form a narrow annular space therebetween with a narrow orifice of critical width defined at the periphery thereof. The fluid mixture to be separated is introduced to the annular space between the discs and projected at high velocity from its periphery through the critically sized and shaped orifice. Separation of the flashable component or components from the mixture is effected by imparting sufficient energy to atomize the mixed fluid through the limited orifice in such manner as to provide a relatively maximum surface per unit volume of the fluid and sufficient internal energy to the particles to provide driving force for required mass. The transfer dispersal of the fluid takes the form of a continuous horizontal spray of high velocity, greatly energized, mist particles of microdimensions extending from the orifice of the energizing atomizing rotor to the shaped inside wall of the enclosing vessel where they coalesce.

Referring to FIGS. 2–4, and particularly to FIG. 2, at 86 is shown a vessel having an upper portion 86*a* of its wall inclined both upwardly and inwardly relative to the interior of the vessel, relatively vertical side walls, and a lower wall portion 86*b* inclined both downwardly and inwardly relative to the interior of the vessel. On top of the vessel 86 is a motor mounting 87 which supports the motor 88. Referring particularly to FIG. 3, opening 89 is formed in the top center portion of the vessel 86 and receiving rim 90 is circumferentially fastened thereto by welds or other attachments 91. Mounting plate 92 is fixed within the rim 90 by bolts 93. The motor mounting 87 is welded or otherwise fixedly attached to the mounting plate 92 by attaching means or welds 94. Shaft 95 is a continuation of or fixed to the drive shaft of the motor 88 and may be driven in rotation thereby. Plate 92 has opening 96 centrally thereof. Support tube 97 is fixed to the plate 92 by bolts 98, extends therethrough, and has fitting 99 extending from one side thereof as well as recessed portions 100 at the lower end thereof. Pipe 101 is supported by bolt 102 relative to the support tube 97 and surrounds shaft 95 with sleeve bearing 103 fixed to the inside surface thereof to maintain the shaft 95 in position relative thereto. Feed annulus 104 between the outside of the pipe 101 and the inner surface of tube 97 connects at its upper end with the bore of the fitting 99 to permit feed of the fluid to be flask evaporated or vacuum separated therefrom.

Accelerating disc 105 forming the lower surface of the atomizing rotor, has opening 106 centrally therethrough to receive a lesser diameter portion 95*a* of shaft 95 therethrough. Nut 95*b* engages the threaded bottom portion 95*c* of the shaft 95 and fixes the accelerating disc relative to the end of the shaft. The upper central portion of the accelerating disc abuts the under surface of the slightly greater diameter portion 95*d* of shaft 95. The upper surface of the accelerating disc is also recessed as at 105*a* to permit positioning of the lower end of the pipe 101 in close association therewith. Disc 105 is preferably angled slightly upwardly in cross section as it extends outwardly from the central portion thereof. Shrouding disc 107, forming the upper portion of the atomizing rotor, is fixed by bolts 108 (FIG. 4) to accelerating vanes 109 which in turn are fixed to accelerating disc 105. Shrouding disc 107 is preferably substantially horizontal in cross section, that is, fixed essentially at right angles to shaft 95. Shrouding disc 107 has upwardly extending central portion 107*a* which is recessed or indented to permit semi-engagement of tube 97 and the disc and a portion of tube 97 to overlie a portion of the top edge of the shrouding disc. Shrouding disc 107 and tube 97 are spaced one from the other sufficiently to permit rotation of the shrouding disc relative tube 97 and pipe 101 without contact therewith.

The annulus or space 110 between the accelerating and shrouding discs connects at its inward end with annulus 104 between pipe 101 and tube 97 to permit feed of liquids or fluids to be stripped or flashed into the rotating disc where vanes 109 will pump it through the orifice 111. The orifice 111 at the periphery of the two discs, to effectively operate to properly disperse the fluids, must be formed by two edges which are essentially (vertically) in line and not over twenty-thousandths of an inch apart. We have discovered that if either the periphery of the shrouding disc or the periphery of the accelerating disc extends past the other or the orifice therebetween exceeds 0.020 inch, the apparatus will not effect sufficient dispersal of the liquid or fluid to be stripped or flashed. The upward angling of the accelerating disc or, indeed, the relative angle of either disc relative to the shaft 95, is not critical, provided the peripheries of both discs are essentially vertically in line and the orifice is of an aperture in the range of two to twenty-thousandths of an inch. One one-hundredth of an inch is about optimum gap for most edible oils.

Referring to FIG. 2, legs 112 support the vessel 86 and an opening is positioned preferably centrally of the bottom of the vessel with draw-off line 113 leading therefrom with pump 114 connected thereto. Vacuum line 115 draws preferably from the top portion of the vessel. Steam or any other inert gas may be supplied to the vessel through pipe 116 and is preferably introduced beneath the atomizing disc through a hollow perforated ring 117. At any rate the vacuum takeoff should be on the opposite side of the spray from the steam input.

In operation of the FIGS. 2–4 modification, the fluid to be flashed or stripped is introduced through line 118 (22, 39 or 59) to fitting 99 where it passes down annulus 104 and into space 110 between the shrouding and the accelerating discs. In the throat of the rotor, the fluid is picked up by vanes 109 and the rotation of the discs by shaft 95 moves the fluid outwardly where it is projected through orifice 111 in the form of mist particles of microdimensions which travel from the orifice to impinge upon the upwardly and inwardly slated portion 86*a* of vessel 86. The rotor must most preferably be positioned so the particles impinge on the upwardly and inwardly inclined surface 86*a* and not the vertical portions thereof whereby the outward momentum of the particles may be transformed into downward momentum. The volatile constituents are evaporated from the finely divided energized mist particles during the traverse. The volatiles in the form of water vapor, gases and the like are withdrawn from the confined space within the vessel through vacuum outlet 115 which is connected to a vacuum head, not shown. The vacuum in the vessel is normaly controlled within the range of one-quarter inch to ten inches of mercury absolute pressure depending upon the final water content or other volatile or odoriferous content desired in the fluid being treated.

We have conclusively established that an extension of the lip of either the shouding or accelerating disc as in conventional rotors or the provision of an orifice of greater width than twenty-thousandths of an inch, with or without such extension, will substantially inhibit successful operation in the rotor in edible oil processing and make substantially more difficult the accomplishment of the objects of the invention.

Referring to FIG. 5, showing a static spray head, opening 119 is formed in the top center portion of the vessel shell 120 and mounting plate 121, having central opening 122 therein, is fixed to the enlarged portion 119*a* of opening 119 by bolts 123. Shrouding disc 124 is fitted by its upwardly-extending portion 125 into opening 122. L-fitting 126 has peripheral flange 127 at its lower end which is engaged by bolts 128 which also engage threaded openings in the upper flange portion 124a of the shrouding disc 124. A lower disc 129 has bolt openings 130 arranged peripherally of its outer edge to match openings 131 in the shrouding disc 124. A lower disc 129 has bolt openings 130 arranged peripherally of its outer edge to match openings 131 in the shrouding disc. Lower disc 129 is fixed relative to shrouding disc 124 by two constructions. In the first place, limit stops 132 limit the allowed closeness of the two discs while bolts 133 extend through openings 131 and 130 and have springs 134 encircling the bolts and regulated in compression against the underside of lower disc by nuts 135 and washers 136 threaded on the lower ends of bolts 134. The upper heads of the bolts 133 as shown at 133a rest on leveling abutment 136 formed on the shrouding disc. Vacuum takeoff in this construction may comprise exhaust pipe 137 which optionally extends out the side wall of the vessel with its intake end positioned centrally under lower disc 129 as seen in FIG. 5.

Lower disc 129 has upwardly-extending central portion 129a to guide the input fluid uniformly outwardly in the channel 138 formed between the two discs. The required pressure for forcing the fluid outwardly between the annulus 139 defined by the vertically aligned outer disc edges of the modification of FIG. 5 depends largely on the viscosity thereof. The pressure must be sufficient to drive the material outwardly through the orifice between the two discs so as to impinge at high velocity on the knuckle radius (downwardly curved wall) of the vessel. The crucial range orifice gap must be maintained within the two-thousandths (0.002) of an inch to twenty-thousandths (0.020) of an inch range previously set forth relative the rotor modification.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. Apparatus for stripping liquids comprising, in combination, a flow line, said flow line communicating to a vessel defining a zone of reduced pressure, a reduced orifice spray device in said vessel zone of reduced pressure connected to said flow line operable to disperse said liquid in finely divided particles therein, a liquid level control on said vessel, a vacuum line from said vessel above said spray device therein, a liquid withdrawal line from the lower portion of said vessel, a recycle line passing from said withdrawal line to said flow line communicating to said spray device, a back pressure valve on said flow line comunicating to said spray device down stream of the recycle line connection therewith, a control valve on said withdrawal line past said recycle line connection actuated by said liquid level control, and pump means on said withdrawal line between the recycle line connection and the vessel.

2. Apparatus as in claim 1 including a second vessel defining a second zone of reduced pressure therein, a second flow line connected to said first vessel withdrawal line past said control valve thereon and passing to said second vessel, a second reduced orifice spray device in said second vessel to distribute liquid in a fine dispersed spray into said second vessel connected to said second flow line, a second vacuum line connected to said second vessel, a second liquid level control device on said second vessel, a second withdrawal flow line from said second vessel, a second recycle line connected to said second withdrawal line and joining the said second flow line to said second vessel, a back pressure valve on said second flow line downstream of the recycle line connection therewith, a second control valve on said second withdrawal line downstream of said second recycle connection operated by said second liquid level control, and pump means on said second withdrawal line up stream of said recycle line connection.

References Cited in the file of this patent
UNITED STATES PATENTS

| | | |
|---|---|---|
| 378,843 | Lillie | Feb. 28, 1888 |
| 1,398,735 | MacLachlan | Nov. 29, 1921 |
| 1,831,892 | Thompson | Nov. 17, 1931 |
| 2,103,887 | Bowen et al. | Dec. 28, 1937 |
| 2,300,985 | Smith | Nov. 3, 1942 |
| 2,368,049 | Stratford | Jan. 23, 1945 |
| 2,489,509 | Straight | Nov. 29, 1949 |
| 2,621,196 | Thurman | Dec. 9, 1952 |
| 2,674,609 | Beal et al. | Apr. 6, 1954 |
| 2,734,565 | Lockman et al. | Feb. 14, 1956 |
| 2,796,120 | Lockman | June 18, 1957 |
| 2,838,135 | Pilo et al. | June 10, 1958 |
| 2,919,232 | Stingley | Dec. 29, 1959 |
| 2,931,433 | Mertz | Apr. 5, 1960 |
| 2,990,011 | Stratford | June 27, 1961 |